United States Patent [19]

Chagnon et al.

[11] Patent Number: 5,688,581
[45] Date of Patent: Nov. 18, 1997

[54] ELECTROGRAPHIC IMAGE TRANSFER ELEMENT HAVING A PROTECTIVE LAYER

[75] Inventors: Theresa M. Chagnon, Chicopee; Douglas Allan Cahill, Belchertown; Richard Scott Himmelwright, Wilbraham; Dene Harvey Taylor, Holyoke, all of Mass.

[73] Assignee: Rexam Graphics, Incorporated, South Hadley, Mass.

[21] Appl. No.: 615,958

[22] Filed: Mar. 14, 1996

[51] Int. Cl.[6] .................................................. B32B 9/00
[52] U.S. Cl. .................. 428/195; 428/35.8; 428/35.9; 428/252; 428/286; 428/343; 428/421; 428/422; 428/423.1; 428/447; 428/500; 428/522; 428/913; 430/96; 430/126; 355/64; 355/72; 355/79; 156/230; 156/231; 156/240; 156/241; 156/247
[58] Field of Search ...................... 428/287, 286, 428/253, 252, 421, 422, 520, 522, 447, 448, 195, 343, 423.1, 500, 507, 913; 156/240, 230, 241, 247, 231; 430/96, 126; 355/79, 64, 72

[56] References Cited

U.S. PATENT DOCUMENTS

| | | | |
|---|---|---|---|
| 4,556,589 | 12/1985 | Neumann et al. | 428/35 |
| 5,266,431 | 11/1993 | Mammino et al. | 430/96 |
| 5,316,608 | 5/1994 | Ocampo et al. | 156/230 |
| 5,400,126 | 3/1995 | Cahill et al. | 355/278 |
| 5,414,502 | 5/1995 | Cahill et al. | 355/278 |
| 5,483,321 | 1/1996 | Cahill et al. | 355/200 |

OTHER PUBLICATIONS

Kynar SL® Technical Data, Elf Atochem King of Prussia, Pa, Mar., 1993.

*Primary Examiner*—Patrick Ryan
*Assistant Examiner*—Abraham Bahta
*Attorney, Agent, or Firm*—Ratner & Prestia

[57] ABSTRACT

An electrographic image transfer element having a protective coating is disclosed. The protective coating is a single protective layer that contains a fluoropolymer and an acrylic polymer. Because the protective coating is resistant to surface pitting, dirt, stains, and general degradation, images formed from the element can be used effectively on billboards, banners, and other outdoor signs.

23 Claims, 2 Drawing Sheets

Fig. 5

ELECTROGRAPHIC IMAGE TRANSFER ELEMENT HAVING A PROTECTIVE LAYER

BACKGROUND OF THE INVENTION

1. Field of the Invention

This invention relates to an image transfer element having a protective coating. In particular, this invention relates to an electrographic image transfer element having a homogeneous protective layer containing a fluoropolymer and an acrylic polymer.

2. Description of Related Art

Electrographic imaging techniques are well known in the manufacture of single or multicolor images and more particularly large images such as panels, billboards, banners, and the like. To make such large images, an electrostatic latent image is first produced directly by imagewise depositing charge onto an accepting dielectric surface. The latent image is then toned with a suitable toner.

In a number of applications the electrographically produced toned image is next transferred onto a receiving substrate. A method for creating and transferring an electrographically produced toner image, from an initial substrate to a final substrate, for use in large format posters, billboards, banners, and the like, is disclosed in Cahill, U.S. Pat. No. 5,414,502. The method uses an electrographic element having a carrier layer, a conductive layer, an optional protective layer, a dielectric layer, and a top adhesive layer. Imaging, toning, and transfer of the image onto a final permanent receptor creates an imaged element in which the toner is protected by the adhesive and dielectric layers, and, optionally the protective layer.

The presence of a protective layer is essential in applications in which the imaged article will be subject to handling or exposed to the elements. Particularly in cases where the end use is as a billboard, banner, poster, wall covering, and the like, it is important that the protective layer be resistant to abrasion, graffiti, and degradation due to ultraviolet radiation exposure, be non-tacky, and in addition, be inexpensive.

Protective layers that perform very well are known, such as laminated layers of polyethylene terephthalate sheet. However such layers are neither inexpensive nor easy to apply.

It is also well known that fluoropolymers can provide a surface which is non-sticky and has good resistance to graffiti, since paint does not adhere permanently to it, and furthermore has good resistance to the elements in general.

The advantages of fluoropolymer layers are also the major problem with their use as protective layers. Plainly said, nothing sticks to them, but by the same token, they don't stick to anything.

In applications where transparency or color is not an issue, such as where a fluoropolymer layer is desired over a vinyl fabric for use as a weather protective surface, it is known to apply a plurality of layers of an acrylic polymer/fluoropolymer composition, beginning with a layer containing substantially all acrylic followed by layers of increasing fluoropolymer content to provide a composite layer structure which presents a top surface having sufficient fluoropolymer content to provide a good weathering surface and an inside surface having sufficient acrylic content to adhere the layer to the substrate.

While this multilayered structure appears successful, it is cumbersome to manufacture and use.

It has also been suggested to provide a coating containing a fluoropolymer as a protective agent to fabric rendered water proof by the application of a plasticized polyvinyl chloride coating. To obtain adhesion of a protective fluoropolymer coating to the plasticized polyvinyl chloride, the fluoropolymer composition contains an acrylic resin and plasticized polyvinyl chloride in addition to the fluoropolymer.

A need exists, therefore, for an inexpensive, clear, transparent, protective layer for electrographically generated images, particularly for large size images, such as posters, panels, and banners. The protective layer must adhere to the element, be able to withstand weathering and graffiti, have good resistance to abrasion, and not interfere with viewing of the image. Preferably the layer should be an integral part of the imaged element so that no additional steps are required for its application.

SUMMARY OF THE INVENTION

These needs are met by an electrographic element comprising, in order:

a) a conductive support base;

b) a release layer;

c) a protective layer consisting essentially of a fluoropolymer and an acrylic polymer, wherein said fluoropolymer has a surface energy of about 16 to 30 dynes/cm, and wherein the weight ratio of fluoropolymer to acrylic polymer is about 65:35 to about 85:15;

d) a dielectric layer comprising a film-forming material having a dielectric constant of about 2 to 5; and e) an adhesive layer.

In an alternative embodiment, the dielectric layer and the adhesive layer are combined into a single, substantially tack-free at ambient temperature, combined transparent dielectric and adhesive layer, wherein the adhesive properties of said combined layer are activated at a temperature which is above ambient temperature of the electrographic element.

In another embodiment, the invention is an imaged article having a protected surface, comprising in order:

1) a receptor substrate;

2) a toned image;

3) an adhesive layer;

4) a dielectric layer comprising a film-forming material having a dielectric constant of about 2 to 5; and 5) a protective layer consisting essentially of a fluoropolymer and an acrylic polymer, wherein said fluoropolymer has a surface energy of about 16 to 30 dynes/cm and wherein the weight ratio of fluoropolymer to acrylic polymer is about 65:35 to about 85:15.

BRIEF DESCRIPTION OF THE DRAWINGS

The invention can be more fully understood from the following description thereof in connection with the accompanying drawings described as follows.

DESCRIPTION OF THE PREFERRED EMBODIMENT(S)

Throughout the following detailed description, similar reference characters refer to similar elements in all figures of the drawings.

Figure 1:
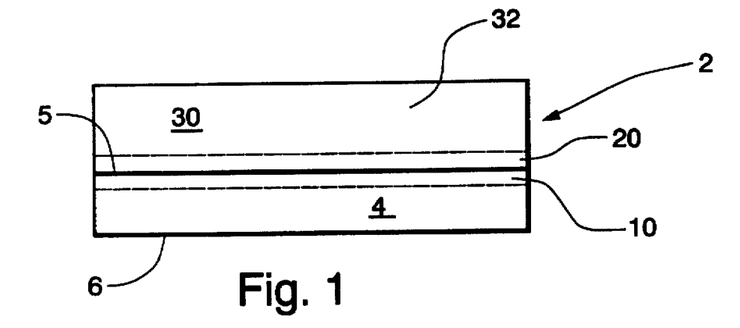
FIG. 1 is a schematic cross-sectional representation of an element in accordance with the present invention.

Referring to FIG. 1, an electrographic element 2 is shown which comprises a conductive support base 4 having a front surface 5 and a back surface 6. The front surface 5 is covered by a release layer 10 which in turn is covered by an image layer structure 30.

Conductive Support Base

Conductive support base 4 functions as a support for the superposed layers and may be any web or sheet material possessing suitable flexibility, dimensional stability and adherence properties to the release layer 10. Typically, the conductive support base will have an electrical resistivity of about 1 to 10 meg-ohm/□.

Suitable web or sheet materials for the support base 4 are flexible polymeric films, e.g., such as polyethylene terephthalate film and the like, or a foraminous material, e.g., such as a paper sheet and the like, treated to be electrically conductive or semi-conductive. Other suitable materials are for instance, metal foils, metallized polymeric films such as polyethylene terephthalate films having a metallic coating thereon, conductive paper sheeting and the like. The web or sheet may also be surface treated or coated with a material to enhance desired surface characteristics.

Conductive support base 4 may comprise a combination of carrier sheet and a conductive layer coated thereover. In such an embodiment the carrier sheet is again a flexible web or sheet material, which may again be a flexible polymeric film, e.g., such as polyethylene terephthalate film and the like, or a foraminous material, e.g., such as a paper sheet and the like. A conductive layer is coated over the carrier sheet which carrier sheet may or may not be itself conductive.

When this conductive layer is used, the conductive layer preferably comprises a film-forming material which may be an organic material, e.g., such as a cation type styrene-methacrylate copolymer having an electrical resistivity of about 1 to 30 meg-ohm/□. Other suitable film-forming, organic materials include polymeric quaternary ammonium compounds, polystyrene sulfonic acid, polymeric matrices capable of ionizing inorganic electrolytes contained therein, and the like. The film-forming, organic material may be used alone or with conductive, inorganic materials and/or metals dispersed therein, e.g., such as tin oxide, aluminum and the like.

Release Layer

Release layer 10, which is adhered to the front surface 5 of the support base 4 (or to the conductive layer when such is used) typically comprises a film forming silicone polymer, or a film forming fluoropolymer. Release layer 10 may cured by heat, ultraviolet radiation, or an electron beam. Release layer 10 may itself be conductive or contain conductive agents such as a quaternary ammonium polymer, and may further include a surfactant. Good release performance has been obtained when the surface energy of the release layer is between 20 and 40 dynes/cm and preferably between 25 and 35 dynes/cm.

Imaging Layer Structure

Imaging layer structure 30 comprises a protective layer and, in its simplest form, a dielectric layer on which there is formed electrographically a latent toner receptive image.

The dielectric layer may be any conventional film-forming material having a dielectric constant of about 2 to about 5. This layer typically has a thickness in the range of about 1 µm to about 20 µm and preferably in the range of about 3 µm to about 10 µm. The dielectric layer, typically comprises one or more polymers selected from polyvinyl acetate, polyvinyl chloride, polyvinyl butyral, polymethylmethacrylate, styrenated acrylics, styrene acrylonitrile, and the like. Other ingredients may be chosen from waxes, polyethylene, alkyd resins, nitrocellulose, ethyl cellulose, cellulose acetate, shellac, epoxy resins, styrene-butadiene copolymers, chlorinated rubbers, polyacrylates, and the like. The property requirements of the dielectric layer 32 are well known in the art as disclosed, for example, in U.S. Pat. Nos. 3,920,880 and 4,201,701.

Preferably, the dielectric layer is transparent. Transparent refers both to translucent and to transparent layers. A transparent imaging layer structure transmits sufficient radiation in at least one region of the visual spectrum that a toned image placed on one side of the layer structure can be readily observed from the other side of the layer structure. Opaque pigments should be avoided and the use of other pigments and light scattering or light absorbing materials should be minimized.

The dielectric layer may be overcoated by a transparent adhesive layer, which is preferably non-adhesive at room temperature but becomes adhesive at elevated temperatures. Such image receiving adhesive layers for use in electrography are known in the art and disclosed in Cahill, U.S. Pat. Nos. 5,363,179 and 5,400,126.

In a preferred embodiment, the imaging layer structure 30 comprises a protective layer 20 and a combined dielectric and adhesive layer 32. Such layers are disclosed in Cahill, U.S. Pat. No. 5,483,321. This combined layer 32 is preferably a conventional film-forming material having a dielectric constant of about 2 to about 5. This layer typically has a thickness in the range of about 1 µm to about 20 µm and preferably in the range of about 3 µm to about 10 µm.

The combined dielectric and adhesive layer 32 typically, comprises one or more polyesters; polyurethanes; polyamides; polyolefins; polycarbonates; polystyrenes; and/or polymers or copolymers of acrylic or methacrylic acids, esters, amides, or the like (such as polymethylmethacrylate), styrenes, acrylonitriles, vinyl esters, alkyd substituted vinyl esters, vinyl alcohol, vinyl acetals (e.g., polyvinyl butyral), vinyl chloride, vinyl fluoride, vinylidene chloride, 1,4-dienes (e.g., butadiene, isoprene and the like); ethylene/vinyl alcohol copolymers; copolymers of styrene with acrylic and methacrylic monomers; modified cellulosic resins such as cellulose acetate and cellulose acetate butyrate; block copolymer thermoplastic rubbers (e.g., styrene/ethylene/butylene/styrene block copolymer); and blends of the above.

The combined dielectric and adhesive layer 32 in addition to its dielectric properties, is activated at a pressure and a temperature that is above the normal ambient pressure and temperature of the electrographic element prior to use to exhibit its adhesive properties. Thus the combined dielectric and adhesive layer is non-tacky prior to activation.

The surface of the combined dielectric and adhesive layer 32 is preferably rough to ensure good transfer of charge during passage of the element under the stylus bar during imaging. This roughness can be obtained by including in the layer particles sufficiently large to give surface irregularities to the layer. Particles of diameter in the range of about 1 μm to about 15 μm are suitable. Particle composition and size are chosen to give the required dielectric constant to the layer as well as the appropriate surface topography and abrasive properties to the layer.

The combined dielectric and adhesive layer 32 is transparent in at least one region within the visible spectral region and preferably is transparent throughout the visible spectral region.

Protective Layer

Imaging structure 30 also comprises protective layer 20, which is also transparent. Protective layer 20 consists essentially of a fluoropolymer and an acrylic polymer. Fluoropolymer refers to polymers whose structure comprises fluorine atoms covalently bonded to carbon atoms. As is well known to those skilled in the art, such polymers can be prepared by polymerization of fluorinated monomers, such as tetrafluoroethylene, hexafluoropropylene, vinylidene fluoride, and vinyl fluoride, with each other and/or with non-fluorinated monomers, such as ethylene.

Fluoropolymers that may be used in the protective layer are those that can be coated from a homogenous solution and yet have a relatively low surface energy. The fluoropolymer must be sufficiently soluble in a coating solvent that a homogeneous coating solution comprising the fluoropolymer and the acrylic polymer can be formed. The coating solvent must be fugitive, that is, it must have a sufficiently high vapor pressure that it can be removed following coating of the protective layer. Preferred coating solvents are fugitive ketones, such as acetone, methyl ethyl ketone, methyl propyl ketone, methyl butyl ketone, methyl i-butyl ketone, and cyclohexanone. Small amounts of fugitive co-solvents may be used, provided that the ability of the solvent to form a homogeneous coating solution comprising the fluoropolymer and the acrylic polymer is not adversely affected.

The fluoropolymer should have a surface energy of 16 to 30 dynes/cm. This surface energy is sufficiently low to provide the layer with the desired protective properties. Copolymers of vinylidene fluoride and tetrafluoroethylene may be used. Fluoropolymers having a high content of vinylidene fluoride (i.e., greater than 30% by weight) have good stability in organic solvents. As a result, the application and formation of a coherent sealing film is facilitated without causing damage to the underlying layers of the element. A preferred fluoropolymer is Kynar® SL, a copolymer of vinylidene fluoride and tetrafluoroethylene. Polymers of perfluorovinyl ethers, sold under the tradename of Lumiflan® (ICI Americas, Wilmington, Del.), may also be useful.

In combination with certain concentrations of acrylic polymers, fluoropolymers attain good adhesive quality to the combined adhesive and dielectric layers of the electrographic element without apparent loss of their advantageous protective qualities. The acrylic polymer should be compatible with the fluoropolymer. Useful acrylic polymers include polymers and copolymers of esters of acrylic acid and methacrylic acid, such as methyl acrylate, methyl methacrylate, ethyl acrylate, ethyl methacrylate, propyl acrylate, propyl methacrylate, butyl acrylate, butyl methacrylate, and similar monomers. These materials can be prepared by polymerization techniques well known to those skilled in the art and are sold under of a variety of tradenames, including Acryloid® (Rohm and Haas) and Elvacite® (Du Pont). A preferred acrylic polymer is Acryloid® A-101, methyl methacrylate acrylic polymer.

A protective layer comprising a mixture of a fluoropolymer and acrylic polymer at weight ratios ranging from about 65:35 to about 85:15, fluoropolymer to acrylic polymer, provides adequate protection from hazards as well as good adhesion. A ratio of about 75:25, fluoropolymer to acrylic polymer, is preferred. The protective layer typically has a dry thickness of about 0.5 to 5 micrometers, preferably about 1.0 to 2.0 micrometers. The protective layer should have a surface energy less than 50 dynes/cm, preferably less than 45 dynes/cm, more preferably less than 40 dynes/cm.

Protective layer 20 may comprise photostablizers that protect both the layer and the underlying image from damage by ultraviolet light. Typically photostabilizers include materials that strongly absorb ultraviolet radiation, such as 2-hydroxybenzophenones, oxalanilides, aryl esters and the like, as well as hindered amine light stabilizers, such as bis(2,2,6,6-tetramethyl-4-piperidinyl) sebacate (Tinuvin® 770) and the like; and combinations thereof. To prevent distortion of the underlying image when it is viewed through the protective layer, materials that do not absorb strongly in the visible region of the spectrum are preferred.

Other added components include infrared absorbing or reflecting materials for thermal protection; colorants and/or fluorescent optical brighteners to provide desired graphic appearances; and the like.

At times it is desired to provide a range of surface finishes from highly glossy to matte. This is done by controlling the outermost surface of the protective layer of the imaged article. This surface replicates the surface of the release layer with which it is in contact prior to lamination and separation, as discussed later on in this description. Thus if the release layer has a rough texture, or contains any other relief pattern, the final image will appear matte, and if the release layer surface texture is smooth, the final image will be glossy.

Alternatively, a matte surface on the finished image can be obtained by including, in the protective layer, particles sufficiently large to give surface irregularities to the layer. Particles of average diameter in the range of about 1 μm to about 15 μm are suitable.

Image Formation

The image is formed by forming a latent image of charge on the surface of imaging layer structure 30 of electrographic imaging element 2, toning the latent image, laminating a receptor to toned surface, and removing the support structure (i.e., the support base and release layer) to form an image comprising, in order, the imaging layer structure (i.e., the protective layer and the dielectric layer and the adhesive layer), the toned image, and the receptor. Image formation will be described with respect to an electrographic element in which the dielectric layer and the adhesive layer are combined in a single layer. However, those skilled in the art will readily appreciate that images may be prepared from elements comprising additional or different layers by appropriate modifications of this procedure. For example, if the element comprises separate adhesive and dielectric layers, instead of a combined dielectric/adhesive layer, the latent image is formed by charge deposition on the adhesive layer, rather than on the combined dielectric/adhesive layer.

Referring to FIG. 1, a latent image is first formed by charge deposition on the surface of combined dielectric/adhesive layer 30. In such processes, an electrostatic latent image is produced directly by imagewise depositing electrical charge onto an accepting dielectric surface. Typically, styli are used to create these charge patterns and are arranged in linear arrays across the width of the moving dielectric surface. The latent image is then toned with an appropriate toner. Any conventional electrographic process may be used to form such image and to apply toner particles. Electrographic processes, and the associated apparatus, are disclosed in Helmberger, U.S. Pat. No. 4,007,489; Doggett, U.S. Pat. No. 4,731,542; and St. John, U.S. Pat. No. 4,569,584.

Figure 2:
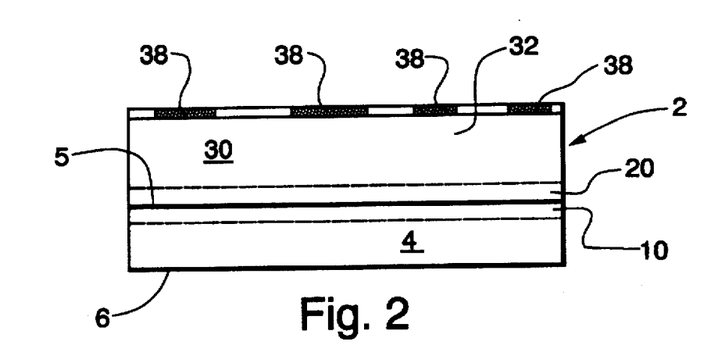
FIG. 2 schematically illustrates a toned imaged electrographic element used in the process of producing an image according to the present invention.

When a multi-colored image is desired, the imaging and toning steps are repeated with additional toners of different colors, in either sequentially arranged imaging and toning stations or by passing the element under the same imaging station and replacing the toner in the toning station. Color reproduction usually requires three and preferably four different color toners to render a pleasing and accurate facsimile of an original color image. The selection of toner colors and the creation of the different images whose combination will provide such accurate rendition of an original image is well known in the art. FIG. 2 depicts the toned image. The image is made of toned regions 38 on the surface of combined dielectric/adhesive layer 30.

Figure 3:
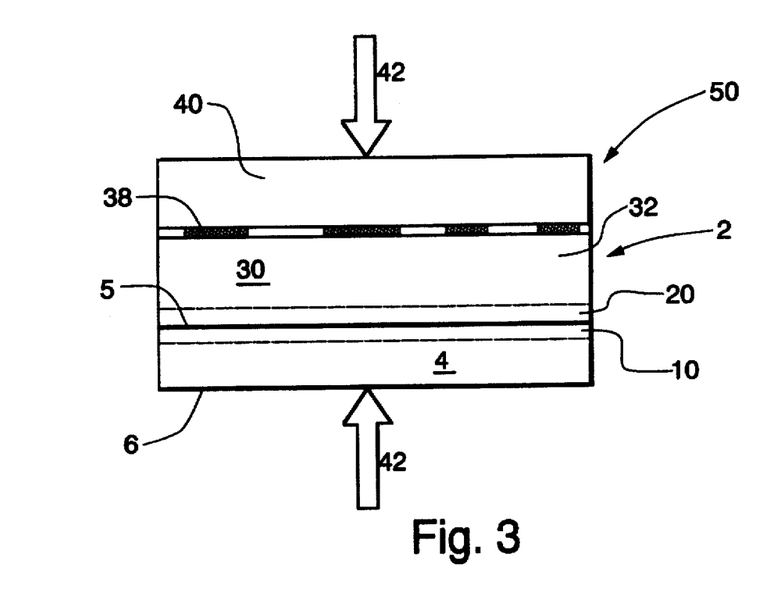
FIG. 3 schematically illustrates the step of laminating the element of FIG. 2 on a receptor surface for producing an image in accordance with the present invention.

Referring to FIG. 3, receptor substrate 40 is shown contacted and pressure laminated to toned layer 38 using applied pressure 42 to back side 6 of support base 4 and receptor substrate 40 to form laminated imaged electrographic element 50. Receptor 40 is laminated to the surface of the imaged electrographic element under an applied pressure of about 0.5 Kg/cm$^2$ (7 p.s.i.) to about 100 Kg/cm$^2$ (1422 p.s.i.) or more. The term "applied pressure" is intended to mean the absolute pressure which is applied to a unit area of the surface as conventionally derived from the geometry of the pressure means, e.g., the geometry of the laminating nip, in combination with a measurement means, e.g., a calibrated gauge pressure.

Suitable means that may be used to apply pressure include platen presses; counterpoised, double roll, laminating devices; scanning, single roll, laminating devices; vacuum laminating devices; and the like. When the receptor has an air impervious surface, roll laminating devices are preferred because they readily minimize air entrapment between the image and the receptor. Vacuum may be used to eliminate air entrapment. When the receptor is rigid and roll laminating devices are used, the imaged electrographic element typically is pressure laminated to the receptor.

Receptor 40 typically functions as the final support for the imaged electrographic element. The receptor may be any surface upon which an electrographic image is desired. Typically, it is a web or sheet material possessing dimensional stability and adherence properties to the activated adhesive properties of combined dielectric/adhesive layer 30. It may be a flexible polymeric film, such as polyethylene terephthalate film; a foraminous material, such as a paper or textile fabrics; metal films or webs, such as aluminum, steel, tin-plate; or any composites or laminates. thereof. The receptor may also be a rigid or semi-rigid sheeting or plate, such as sheeting or plates of metal, glass, ceramic, plastic, cardboard, or any composites or laminates thereof. It may vary in size from that of a photographic print, e.g., having an area of about 30 cm$^2$ or less, to that of billboards or banner, e.g., having an area of about 70 m$^2$ or greater. The receptor may be surface treated or coated with a material to enhance desired surface characteristics.

Heat is used in the pressure laminating step to raise the temperature of combined dielectric and adhesive layer 32 from its normal ambient temperature (e.g., room temperature) where it is substantially tack-free, to a temperature at which the adhesive properties are activated. Heat may be applied to combined dielectric and adhesive layer 36 prior to and/or concurrently with the application of applied pressure 42. Thus, receptor substrate 40 and/or imaged electrographic element 2 may be heated prior to pressure lamination by radiant or contact heaters and then laminated while hot. Alternatively the pressure means itself may also function as a heater. e.g., such as a hot roll laminator, or both prior and concurrent heating may be used in combination. Preferably, a laminating temperature of about 100° C. or greater is employed. Typically, temperature is measured on the surface of the heated roll or platen by means of temperature sensitive tape.

Lamination produces strong adhesion between toned electrographic element 2 and receptor 40. Heat is used during lamination to raise the temperature of combined dielectric/adhesive layer 30 from ambient temperature (e.g., room temperature), where it is substantially tack-free, to a temperature at which the adhesive properties are activated. Heat may be applied prior to and/or concurrently with the application of pressure. For example, combined dielectric/adhesive layer 30 and receptor 42 may be heated by radiant or contact heaters and then laminated while hot. Alternatively the pressure means itself may also function as a heater, such as a hot roll laminator, or both prior and concurrent heating may be used in combination. Preferably, a laminating temperature of about 100° C. or greater is employed.

Figure 4:
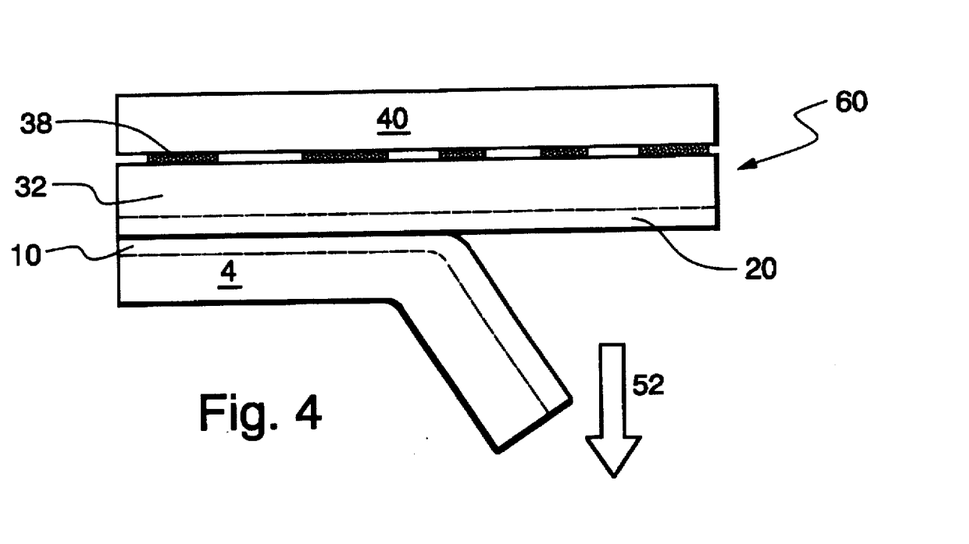
FIG. 4 schematically illustrates the step of peeling off the support base and release layer from the laminated composite created in the step illustrated in FIG. 3.
Figure 5:
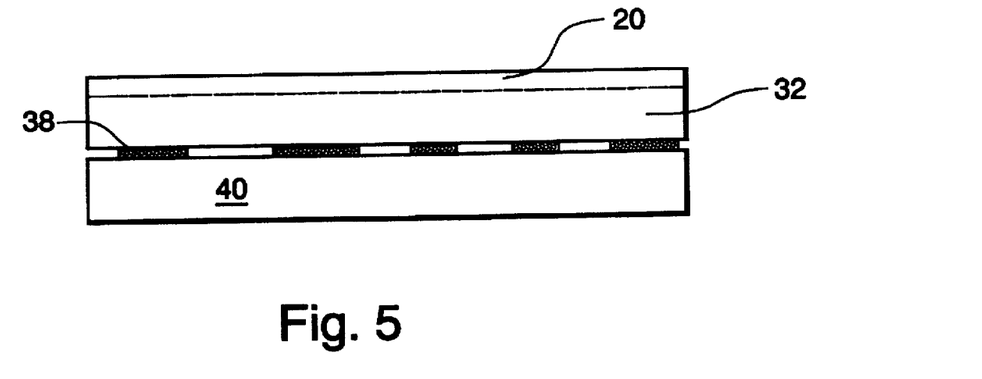
FIG. 5 is a schematic cross-sectional representation of an imaged article prepared in accordance with the present invention.

Referring to FIG. 4, the support structure is peeled, using peel force 52, from the surface of protective layer 20 to form imaged electrographic element 60. Typically, support base 4 is peeled with a peel force directed at an angle of 90° or more from the surface of the protective layer. The peel rate and the peel force are not critical and preferred values will depend on the nature of the conductive and carrier materials. The temperature at which the support structure is peeled from the protective layer will depend on the properties of the release layer. The support structure can be removed about 1 minute or less, and preferably between about 1 second and about 20 seconds, after lamination without delamination of the protective layer or any of the other component layers.

In the preparation of imaged article 60, it is sometimes preferred to keep the support structure in place on the imaged electrographic element throughout storage and processing in order to prevent any damage or marring to the underlying layers. In this instance, removal of the support structure is the very last step in preparing and mounting the protected electrographic image.

As has also been found, the support structure need not be removed immediately. Electrographic element 50 may be cooled and stored before removal of the support structure. In this instance, support base 4 and release layer 10 can be removed at room temperature from imaged electrographic element 50 without delamination of protective layer 20.

INDUSTRIAL APPLICABILITY

The imaged article having the fluoropolymer/acrylic polymer protective coating has extensive industrial applicability. Initially, the protective coating is quite impervious to outdoor environmental damage, such as surface pitting, accumulation of dirt and stains, general degradation, and offsetting, thus allowing the imaged article to function quite effectively on billboards, banners, and the like. In addition, the protective coating is able to withstand certain graffiti cleaning products without a resulting destruction to the underlying image thus furthering the competence of the imaged article's use in the outdoors. The imaged article is also quite invulnerable to indoor hazards such as blocking or sticking together, which may occur in standard office conditions, the trunk of an automobile, and the like.

The advantageous properties of this invention can be observed by reference to the following examples which illustrate, but do not limit, the invention.

EXAMPLES

| Glossary | |
|---|---|
| Acrylic resin E-342 | Solvent based modifier acrylic copolymer (Rohm and Haas, Philadelphia, PA) |
| Acryloid ® A-101 | 40% solids methyl methacrylate acrylic polymer in methyl ethyl ketone (Tg = 105° C.) (Rohm and Haas, Philadelphia, PA) |
| Butvar ® B-76 | Polyvinyl butyral (weight ave. molecular weight: 90,000–120,000) (Monsanto, St. Louis, MO) |
| Hydrocarb ® PG3 | Wet ground calcium carbonate, average particle size of 3 μm (OMYA, Proctor, VT) |
| Kynar ® SL | Copolymer of vinylidene fluoride and tetrafluoroethylene (mp 122–126° C.) (Elf Atochem, King of Prussia, PA) |
| Piccolastic ® A-5 | Low molecular weight polystyrene (Hercules Co., Wilmington, DE) |
| Syloid ® 74 | Amorphous silica slurry, average particle size 9 μm (davison Chemical Division, W. R. Grace, Baltimore, MD) |
| Tinuvin ® 1130 | Substituted hydroxyphenyl benzotriazole stabilizer (Ciba-Geigy, Hawthorne, NY) |
| Tinuvin ® 292 | Hindered amine light stabilizer (Ciba-Geigy, Hawthorne, NY) |

Comparative Example

This example illustrates preparation of an imaged element that does not comprise a clear, homogeneous protective coating layer containing a fluoropolymer and an acrylic polymer.

An electrographic element, having the structure shown in FIG. 1, was prepared as follows. To produce conductive support base 4, a 63 g/m² opaque conductive paper (Product DR Base, Otis Specialty Papers, Jay, Me.) was coated by the offset gravure method with a silicone release layer (SWM 96"C", Rexam Release, West Chicago, Ill.) at a coated weight of 0.4 lbs/tsf (1.95 g/m²). Release layer 10 was cured by electron beam radiation. The surface electrical resistivity of the release coated surface, measured at 50% relative humidity, was 3 Mohm/square. The surface energy was between 25 and 30 dynes/cm. The Sheffield Smoothness was 20 mL/min.

A combined transparent dielectric and adhesive coating mixture was prepared from the following ingredients:

| Ingredient | Parts by Weight |
|---|---|
| Ethanol | 120 |
| Acetone | 440 |
| Toluene | 720 |
| Butvar ® B-76 | 130 |
| Acrylic Resin E-342 | 440 |
| Syloid ® 74 | 20 |
| Hydrocarb ® PG3 | 175 |
| Piccolastic ® A-5 | 52 |

The first three listed ingredients were added to a Kady, mill and the Butvar® was stirred in. After 15 min. of mixing the acrylic resin and the polystyrene were added. After a further 5 min. of mixing, the calcium carbonate and the amorphous silica were added and the mixing continued for 10 min.

To form the electrographic element the resulting dielectric mixture was applied to the release coated surface of the conductive support base by reverse roll coating and dried to give a dry coat weight of 1.3 lbs/tsf (6.3 g/m²).

Rolls of the electrographic element were moisturized to a level of from 6 to 7% by weight. A four color toned image layer was deposited on the adhesive protective dielectric layer using a Versatec® 8944 Color Electrostatic Printer (Xerox Engineering Systems, San Jose, Calif.) using standard toners and coating conditions. The observed image quality was rated high.

The imaged element was laminated onto a receptor surface by first laying the imaged electrographic element on a receptor sheet of ScotchCal® 220 pressure sensitive vinyl (3M, St. Paul, Minn.) with the toned image in contact with the receptor sheet. This composite was then passed through the hot nip of an IT 6000 hot roll laminator (Image Technologies, Cottage Grove, Wis.) at a speed of 2 fpm (0.61 m/min), 250° F. (121° C.) and a pressure of 100 psi (7.03 Kg/cm²). The support base was removed approximately 10 sec. after the laminated composite was removed from the hot nip. The toned image and the dielectric coating remained adhered to the vinyl and the release coating remained on the paper.

The image surface had a low glare surface with a 75° gloss of between 45 and 55%. The image surface had a surface energy of 44 to 46 dynes/cm. The image was not removed by 810 Scotch® Brand Tape when tested with the tape pull procedure. The image withstood cleansing with common non-abrasive water-based household cleaners and gentle scrubbing with a nylon bristle brush.

EXAMPLE 1

This example illustrates preparation of an imaged element that comprises a clear, homogeneous protective coating layer containing a fluoropolymer and an acrylic polymer.

The support base was prepared as described in the Comparative Example. The surface electrical resistivity of the release coated surface, measured at 50% relative humidity, was 3 Mohm/square. The surface energy was between 25 and 30 dynes/cm. The Sheffield Smoothness was 20 mL/min.

The protective layer was prepared from the following ingredients:

| Ingredient | Parts by Weight |
|---|---|
| Methyl Ethyl Ketone | 86.25 |
| Kynar ® SL | 7.50 |
| Acryloid ® A-101 | 6.25 |

The methyl ethyl ketone was added to a stainless steel mix tank. Acryloid® A-101 was added and stirred in with a Lightnin® mixer. Kynar® SL was added and the mixture stirred until the fluoropolymer was completely dissolved (about 30 min). The resulting solution was applied to the release coated surface of the support base by Mayer rod coating and dried to give a dry coat weight of 0.30 lbs/tsf (1.5 g/m²).

The dielectric/adhesive coating mixture was prepared as described in the Comparative Example. It was applied to the surface of the protective layer by the reverse roll coating method and dried to give a dry coat weight of 0.8–1.1 lb/tsf (3.8–5.3 g/m²) to form the electrographic element.

Rolls of the electrographic element were moisturized to a level of about 6% by weight and a four color image layer was deposited on the adhesive protective dielectric layer using a Versatec® 8944 Color Electrostatic Printer (Xerox Engineering Systems, San Jose, Calif.) and standard toners and plotting conditions. Image quality was rated high.

The toned element was laminated to a receptor sheet of ScotchCal® 220 pressure sensitive vinyl as described in the Comparative Example. The support base was removed approximately 10 sec. after the composite was removed from the hot nip. The protective layer image and the dielectric/adhesive coating remained adhered to the vinyl while the release coating remained on the conductive paper. The image on the receptor sheet had a low glare surface with a 75° gloss of between 40 and 45%.

COMPARISON OF THE COMPARATIVE EXAMPLE WITH EXAMPLE 1

An image from the Comparative Example and an image formed in Example 1 were each exposed outside during the summer, facing south at Lancaster, S.C. After more than two months, the image formed in the Comparative Example showed surface pitting and the accumulation of dirt and stains. The image formed in Example 1 showed no pitting, no dirt or staining and was essentially free from degradation.

An image from the Comparative Example and an image formed in Example 1 were each defaced with aerosol spray paint, redwood stain, and permanent marking pens. After 15 min. the images were wiped with paper tissue saturated with iso-propyl alcohol. The ink, paint, and stain were removed from the image formed in Example 1 without degradation of the image. The image formed in the Comparative Example was attacked and degraded by iso-propyl alcohol.

An image from the Comparative Example and an image formed in Example 1 were each placed in a Xenon arc Weatherometer. After 600+ hours, the image formed in the Comparative Example showed signs of surface pitting and degradation. The image formed in Example 1 remained free from degradation.

An image from the Comparative Example and an image formed in Example 1 were each evaluated for offsetting (blocking). Images were placed image side to image side between glass plates and a 16 pound weight (about 7.3 Kg) was placed on top of the plates. Samples were placed in a 50° C. oven for 24 hr. The image from the Comparative Example exhibited severe blocking that destroyed the image. The image formed in Example 1 was free from blocking with the image remaining intact.

Images were transferred onto banner vinyl and were rolled or folded (image side to image side) and placed in the trunk of an automobile for up to 3 months during the summer. The images from the Comparative Example were stuck together, resulting in destruction of the images. The images formed in Example 1 showed no signs of blocking and the image remained untouched.

The images from the Comparative Example exhibited blocking characteristics when folded and kept under standard office conditions. The images formed in Example 1 did not block under standard office conditions.

EXAMPLE 2

This example illustrates preparation and evaluation of a series of electrographic elements in which the protective layer contains different ratios of acrylic polymer to fluoropolymer.

The support base and release layer were prepared as described in the Comparative Example. A series of mixes, each comprising 10% by weight of the polymer mixture, were prepared as described in Example 1. A clear protective layer consisting of a fluoropolymer and acrylic mixture was coated on top of the silicone release layer and dried to give a dry coat weight of 0.18–0.25 lbs/tsf (0.86–1.20 g/m$^2$). The protective layer was coated by a Mayer rod as indicated in Table 1. The dielectric/adhesive coating mixture described in the Comparative Example was applied to the protective layer surface and dried to give a dry coat weight of 0.8–1.1 lbs/tsf (3.8–5.3 g/m$^2$).

The element was laminated to a ScotchCal® 220 pressure sensitive vinyl receptor sheet, as described in the Comparative Example. The support base was removed approximately 10 sec. after the composite was removed from the hot nip. The protective layer image and the dielectric/adhesive coating remained adhered to the vinyl while the release coating remained on the conductive paper.

Samples were evaluated for offsetting/blocking. Samples were placed face to face between glass plates, with a 16 pound weight (about 7.3 Kg) placed on top of the plates and placed in a 50° C. oven for 24 hr. Results are indicated in Table 1.

TABLE 1

| Kynar ®:Acrylic Ratio | Rod Size* | Blocking (Y/N) | Comments |
|---|---|---|---|
| 50/50 | 3 | Y | Failed |
| 50/50 | 10 | Y | Failed |
| 65/35 | 3 | N | Borderline |
| 65/35 | 10 | N | Borderline |
| 75/25 | 3 | N | Good |
| 75/25 | 10 | N | Best - Better than #3 Rod |
| 85/15 | 3 | N | Tight Separation |
| 85/15 | 10 | N | Tight Separation |
| 100/0 | 3 | N | Tight Separation - Adhesion to Dielectric Poor |
| 100/0 | 10 | N | Tight Separation - Adhesion to Dielectric Poor |

*3 Rod = 0.18 lb/tsf (0.86 g/m$^2$)
10 Rod = 0.25 lb/tsf (1.2 g/m$^2$)

EXAMPLE 3

This example illustrates that photostabilizers are compatible with the fluoropolymer/acrylic protective layer.

An electrographic element was prepared as described in Example 1, except that 3% by weight, based on the total weight of the added solids, of Tinuvin® 1130 and 2% by weight, based on the total weight of the added solids, of Tinuvin® 292 were added to the protective layer. The photostabilizers were easily dissolved in the coating solution. The coating solution was coated onto the support base described in the Comparative Example and the dielectric/adhesive coating mixture described in the Comparative Example applied. No coating problems were encountered.

The resulting element was then transferred onto Saturn® banner vinyl (ICG Co., Kingsport, Tenn.) as described in the Comparative Example. Blocking and graffiti removal tests were performed. Addition of the photostabilizers did not adversely affect the functional properties of the protective layer.

EXAMPLE 4

This example illustrates graffiti removal from an element that comprises a clear, homogeneous protective coating layer containing a fluoropolymer and an acrylic polymer.

Imaged elements prepared as described in Example 1 were transferred onto Saturn® banner vinyl as described in Example 1. The image surface had a surface energy of between 40 and 42 dynes/cm. The resulting images were defaced with spray paint, Marks-a-Lot® markers and Sharpie® markers. The banners were placed outdoors for 10 days. Weather conditions were below 0° F. (below −18° C.) with a few days of light snow.

Graffiti removal was attempted with a variety of commercial cleaners. Cleaners fell into the following classes:

1. Cleaners containing strong organic solvents such as acetone, toluene, chlorinated solvents, etc.

2. Cleaners containing primarily petroleum distillates.

3. Non-solvent based cleaners such as non-toxic citrus based cleaners.

4. Iso-propyl alcohol.

The cleaners listed in categories 1 and 2 should not be used. They eat into the fluoropolymer/acrylic polymer protective layer and destroy the underlying image. The non-toxic citrus cleaner (Graffiti Buster®, BioChem Systems of Golden, Colo.) worked exceptionally well. Iso-propyl alcohol also worked well in most instances.

Graffiti from the Sharpie® markers was the most difficult to remove. Iso-propyl alcohol worked better than the Graffiti Buster®. However, each of these cleaners removed a small amount of the image. Graffiti from the Marks-a-Lot® markers was very easy to remove with both cleaners and no damage to the image resulted. Spray paint graffiti was more easily removed with the Graffiti Buster® with only a trace of image damage. It was also noted that the longer the graffiti removers or cleaners sat on the protective coating, the easier the graffiti became to remove.

Having described the invention, we now claim the following and their equivalents.

What is claimed is:

1. An electrographic element comprising, in order:
   a) a conductive support base;
   b) a release layer;
   c) a protective layer consisting essentially of a fluoropolymer and an acrylic polymer compatible with said fluoropolymer, wherein said fluoropolymer has a surface energy of about 16 to 30 dynes/cm, and wherein the weight ratio of fluoropolymer to acrylic polymer is about 65:35 to about 85:15;
   d) a dielectric layer comprising a film-forming material having a dielectric constant of about 2 to 5; and
   e) an adhesive layer.

2. The electrographic element of claim 1 wherein the dielectric layer and the adhesive layer are combined into a single, substantially tack-free at ambient temperature, combined transparent dielectric and adhesive layer, wherein the adhesive properties of said combined layer are activated at a temperature which is above ambient temperature of the electrographic element.

3. The electrographic element of claim 1 wherein the protective layer is coated from a homogeneous solution of said fluoropolymer and said acrylic polymer in a fugitive solvent.

4. The electrographic element of claim 1 wherein the protective layer has a thickness in the range from about 0.5 to about 5 micrometers.

5. The electrographic element of claim 4 wherein the protective layer has a glossy surface.

6. The electrographic element of claim 4 wherein the protective layer has a matte surface.

7. The element of claim 1 wherein the fluoropolymer is a copolymer of vinylidene fluoride and tetrafluoroethylene.

8. The electrographic element of claim 7 wherein the dielectric layer and the adhesive layer are combined into a single, substantially tack-free at ambient temperature, combined transparent dielectric and adhesive layer, wherein the adhesive properties of said combined layer are activated at a temperature which is above ambient temperature of the electrographic element.

9. The electrographic element of claim 8 wherein the release layer comprises an electron beam cured silicone release layer.

10. The electrographic element of claim 9 wherein the combined dielectric and adhesive layer comprises one or more polymers selected from the group consisting of: polyurethanes; polyamides; polyolefins; polycarbonates; polystyrenes; polymers or copolymers of acrylic and methacrylic acids, esters, amides, styrenes, acrylonitriles, vinyl esters, alkyd substituted vinyl esters, vinyl alcohol, vinyl acetals, vinyl chloride, vinyl fluoride, vinylidene chloride, 1,4-dienes; ethylene/vinyl alcohol copolymers; copolymers of styrene with acrylic and methacrylic monomers; modified cellulosic resins; and block copolymer thermoplastic rubbers.

11. The electrographic element of claim 1 wherein said acrylic polymer is a methacrylate acrylic polymer.

12. An imaged article having a protected surface, comprising in order:
   1) a receptor substrate;
   2) a toned image;
   3) an adhesive layer;
   4) a dielectric layer comprising a film-forming material having a dielectric constant of about 2 to 5; and
   5) a protective layer consisting essentially of a fluoropolymer and an acrylic polymer compatible with said fluoropolymer, wherein said fluoropolymer has a surface energy of about 16 to 30 dynes/cm and wherein the weight ratio of fluoropolymer to acrylic polymer is about 65:35 to about 85:15.

13. The imaged article claim 12 wherein the dielectric layer and the adhesive layer are combined into a single, substantially tack-free at ambient temperature, combined transparent dielectric and adhesive layer, wherein the adhesive properties of said combined layer are activated at a temperature which is above ambient temperature of the electrographic element.

14. The imaged article claim 12 wherein the protective layer is coated from a homogeneous solution of said fluoropolymer and said acrylic polymer in a fugitive solvent.

15. The imaged article of claim 12 wherein the fluoropolymer is a copolymer of vinylidene fluoride and tetrafluoroethylene.

16. The imaged article of claim 15 wherein the image on the substrate comprises a plurality of different color toners.

17. An imaged article having a protected surface, comprising in order:
   1) a receptor substrate;
   2) a toned image;
   3) an adhesive layer;
   4) a dielectric layer comprising a film-forming material having a dielectric constant of about 2 to 5; and
   5) a protective layer consisting essentially of a fluoropolymer and an acrylic polymer compatible with said fluoropolymer, wherein said fluoropolymer has a surface energy of about 16 to 30 dynes/cm and wherein the weight ratio of fluoropolymer to acrylic polymer is about 65:35 to about 85:15;

wherein said article is prepared by a process comprising the steps of:

A) electrographically depositing an electrostatic charge in image-wise fashion to form a latent image onto an image receptive surface of an electrographic element comprising, in order:
 a) a conductive support base;
 b) a release layer;
 c) a protective layer consisting essentially of a fluoropolymer and an acrylic polymer, wherein said fluoropolymer has a surface energy of about 16 to 30 dynes/cm, and wherein the weight ratio of fluoropolymer to acrylic polymer is about 65:35 to about 85:15; and
 d) a dielectric layer comprising a film-forming material having a dielectric constant of about 2 to 5; and
 e) an adhesive layer;

B) applying a toner layer onto said electrostatic charge to produce a toned image;

C) contacting said toned image and said adhesive and layer with a surface of the receptor substrate at a temperature sufficient to activate the adhesive layer to adhere the electrographic element to the substrate; and D) removing the support base and the release layer from the protective layer of the electrographic element to form the imaged article.

18. The article of claim 17 wherein in the contacting step (C), the receptor substrate is pressure laminated to the toned image receptive surface by passing the electrographic element and the receptor substrate in surface-to-surface contact through a nip of pressure rollers to form a laminate.

19. The imaged article claim 18 wherein the dielectric layer and the adhesive layer are combined into a single, substantially tack-free at ambient temperature, combined transparent dielectric and adhesive layer, wherein the adhesive properties of said combined layer are activated at a temperature which is above ambient temperature of the electrographic element.

20. The imaged article claim 18 wherein the protective layer is coated from a homogeneous solution of said fluoropolymer and said acrylic polymer in a fugitive solvent.

21. The imaged article of claim 18 wherein the fluoropolymer is a copolymer of vinylidene fluoride and tetrafluoroethylene.

22. The imaged article of claim 20 wherein the image on the substrate comprises a plurality of different color toners.

23. The imaged article of claim 21 wherein said acrylic polymer is a methacrylate acrylic polymer.

* * * * *